April 26, 1938.  W. J. SCHAEFER  2,115,087

TIE ROD END

Filed Feb. 25, 1935.

Inventor
Walter J. Schaefer
By Blackmore, Spencer & Flink
Attorneys

Patented Apr. 26, 1938

2,115,087

UNITED STATES PATENT OFFICE 2,115,087

TIE ROD END

Walter J. Schaefer, Saginaw, Mich., assignor to General Motors Corporation, Saginaw, Mich., a corporation of Delaware Application February 25, 1935, Serial No. 7,984

1 Claim. (Cl. 287—90)

This invention relates to self-adjusting joint structure to compensate for wear of parts and more specifically to a self-adjusting joint between a tie rod and steering arm in the steering mechanism of a motor car.

The tie rod joints of a car are subjected to considerable wear and vibration during the life of the car as they support the whole weight of the tie rod. When the usual bearings and pins become worn, not only is it more difficult to steer the car satisfactorily but also the tie rod begins to rattle and this is very annoying. Therefore, both from the standpoint of safety and comfort, it is desirable to keep these joints sufficiently tight at all times.

An object of this invention is to provide a self-adjusting tie rod joint that will automatically take up wear and remain sufficiently tight.

A further object is to provide a tie rod joint that will require a minimum of attention.

A still further object is to provide a tie rod joint having the above characteristics which is also simple and practical.

With these and other objects in mind, my invention resides in the construction as set forth in the specification and claim and illustrated in the accompanying drawing, in which:

Figure 1:
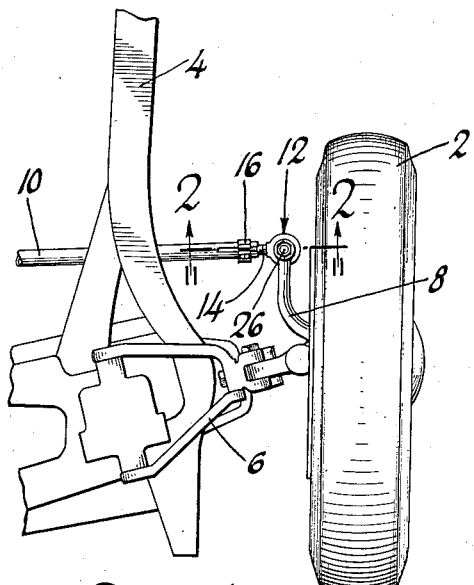
Figure 1 is a top plan view of a front wheel and its support and connections.

A front wheel 2 is pivotally supported on a frame 4 by a suitable spring linkage 6. A steering arm 8 to turn the wheel about its pivot is connected to a tie rod 10 by a tie rod end joint 12 which is the subject matter of this invention.

The end of the tie rod is hollow, split and internally threaded, and into it is screwed a short shaft 14 of the tie rod end. When it is in the proper position, a clamp 16 is tightened around the split portion to hold the end tightly. Integral with the threaded shaft 14 is a hollow inverted cup-shaped member 18 in which are located two matching shoes 20, 22 of lubricant impregnated material having the central portion cut out in a spherical form to accommodate the spherical head 24 of a stud bolt 26. The upper shoe 20 has an opening 28 in the top in alignment with an opening 30 in the base of the inverted cup and through these two the shaft 32 of the stud bolt passes.

Figure 2:
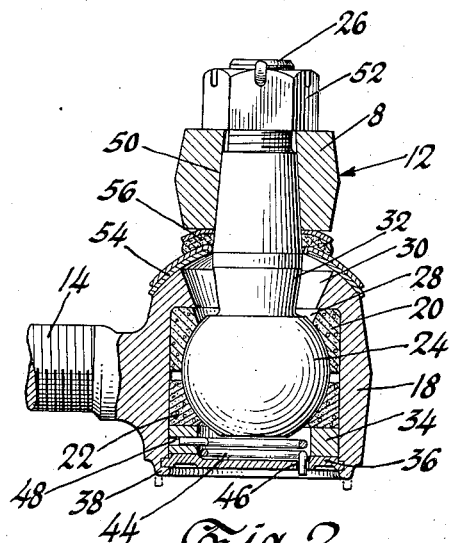
Figure 2 is an enlarged section taken on the line 2—2 of Figure 1.
Figure 3:
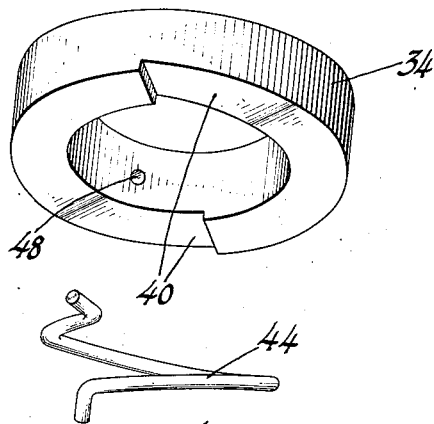
Figure 3 is an enlarged detail perspective view of the adjusting means, the parts being shown in spaced relation.
Figure 4:
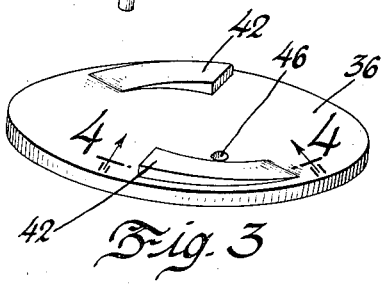
Figure 4 is a sectional view taken on the line 4—4 of Figure 3.

The two mating shoes have their faces spaced apart so that there may be relative motion toward each other to take up wear. Supporting the lower shoe 22 is a washer 34 which in turn rests upon a plate 36 which is secured in the lower end of the opening by the edge 38, which is bent over from a vertical position as shown by dotted lines in Figure 2. The plate is then firmly secured to the member 18. The lower face of the washer 34 has two diametrically opposite slanting notches 40 cut therein, and the plate has two opposite slanting raised tongues 42 which mate with the notches 40. Thus when the washer is rotated over the plate it will be pushed up axially and the two will separate. There is also provided a torsion spring 44 between the washer and the plate, one end of the spring being secured to a hole 46 in the plate, and the other end to a hole 48 in the side of the washer. It is thus evident that as the washer presses up on the lower shoe 22 and is kept in place by the plate that the spring 44 is kept under strain. As the shoes wear and the lower moves up, the spring will cause the washer to follow the movement of the shoe, and since the two ends of the spring are fixed as the pressure is taken from the spring, it will cause the washer to rotate on the plate and the surfaces of the notches will ride upon the tongues and keep the washer in contact with the lower shoe to take up wear.

The shaft of the stud bolt, as before mentioned, extends through the openings 28 and 30 in the upper shoe and cup member respectively, and then passes through an opening 50 in the steering arm 8 and is secured thereto by nut 52. A suitable dust guard 54 and sealing ring 56 are provided around the shaft of the stud between the member 18 and the steering arm to cover the opening 30 in any angular position of the stud and keep out dirt and water.

Therefore, I have provided a self-adjusting tie rod end actuated by a spring and comprising raised and notched portions and one which does not have to be greased as the shoes are made of lubricant impregnated material. Therefore, the end needs practically no attention.

I claim:

In a tie rod joint; an inverted cup-shaped casing; a spherically headed bolt projecting through the casing; two matching members within the casing enclosing said head; and means to insure a tight fit between the members and the head comprising a flat plate secured to the casing having two diametrically opposed inclined surfaces pressed up from one face thereof, an annular washer having a spring securing opening formed therein, two notches in one face which form inclined surfaces adjacent the inclined surfaces on the plate and its other face parallel to the first face and contacting one of said matching members, and a spring within the annular washer having one end secured within the spring securing opening and the other end secured to the plate whereby the washer may rotate with respect to the plate upon a change in pressure on the washer to cause the washer to keep the said matching members in tight engagement with the head, the flat portion of the plate and the adjacent face of the washer being spaced apart a slight amount by the cooperating inclined surfaces.

WALTER J. SCHAEFER.